United States Patent
Eloo et al.

(10) Patent No.: US 7,033,152 B2
(45) Date of Patent: Apr. 25, 2006

(54) UNDERWATER PELLETIZER WITH POSITIVELY CONTROLLED CUTTER HUB

(75) Inventors: Michael Eloo, Xanten (DE); Jurgen Veltel, Kevelaer (DE)

(73) Assignee: Gala Industries, Inc, Eagle Rock, VA (US)

( * ) Notice: Subject to any disclaimer, the term of this patent is extended or adjusted under 35 U.S.C. 154(b) by 220 days.

(21) Appl. No.: 10/434,357

(22) Filed: May 9, 2003

(65) Prior Publication Data
US 2004/0009254 A1 Jan. 15, 2004

Related U.S. Application Data

(60) Provisional application No. 60/378,660, filed on May 9, 2002.

(51) Int. Cl.
*B29B 9/06* (2006.01)

(52) U.S. Cl. .......................... 425/67; 425/308

(58) Field of Classification Search ............... 425/67, 425/308, 311, 313
See application file for complete search history.

(56) References Cited

U.S. PATENT DOCUMENTS

| | | | |
|---|---|---|---|
| 2,432,734 A | 12/1947 | Doesken | 25/109 |
| 3,196,487 A | 7/1965 | Snelling | 18/12 |
| 3,317,957 A | 5/1967 | Heston et al. | 18/12 |
| 3,353,213 A | 11/1967 | Niemeyer | 18/12 |
| 3,832,114 A | 8/1974 | Yoshida | 425/313 |
| 3,912,434 A | 10/1975 | Nagahara et al. | 425/142 |
| 4,123,207 A | 10/1978 | Dudley | 425/67 |
| 4,179,255 A | 12/1979 | Hale | 425/67 |
| 4,500,271 A | 2/1985 | Smith | 425/67 |
| 4,529,370 A | 7/1985 | Holmes et al. | 425/142 |
| 4,614,307 A | 9/1986 | Lauser | 241/101.4 |
| 4,728,276 A | 3/1988 | Pauley et al. | 425/67 |
| 4,813,829 A | 3/1989 | Koppelmann | 409/136 |
| 5,059,103 A | 10/1991 | Bruckmann et al. | 425/67 |
| 5,110,523 A | 5/1992 | Guggiari | 264/40.5 |
| 5,146,831 A | 9/1992 | Fetter, Jr. et al. | 83/698 |
| 5,190,768 A | 3/1993 | Ishida et al. | 425/67 |

(Continued)

FOREIGN PATENT DOCUMENTS

| | | |
|---|---|---|
| DE | 2638126 | 3/1978 |
| DE | 3721235 | 2/1988 |
| DE | 4408235 | 2/1995 |

(Continued)

OTHER PUBLICATIONS

WPI Abstract Acession No. 94-290387 [36] JP 06218727 A (Kobe Steel) Aug. 9, 1994, Abstract.

(Continued)

*Primary Examiner*—Joseph S. Del Sole
(74) *Attorney, Agent, or Firm*—Jacobson Holman PLLC

(57) ABSTRACT

A cutter hub and blade assembly supported and driven for rotational and axial movement in relation to the die face of a die plate in an underwater pelletizer including a positive control of such axial movement to obtain and maintain optimal axial position of the cutter hub and blades during the pelletizing operation and to minimize wear of the mechanical components involved. Positive control of the axial movement of the cutter hub and blades is obtained by a hydraulic/pneumatic actuation system controlling an elongated motion rod that extends through a driven hollow motor shaft. One end of the motion rod is connected with a hydraulic/pneumatic control and the other end of the rod is connected to a cutter hub holder that supports the cutter hub and blades for axial movement toward or away from the die face.

8 Claims, 4 Drawing Sheets

U.S. PATENT DOCUMENTS

| | | | |
|---|---|---|---|
| 5,435,713 A | 7/1995 | Yamasaki et al. | 425/311 |
| 5,527,176 A | 6/1996 | Ishida | 425/142 |
| 6,217,802 B1 * | 4/2001 | Messina et al. | 264/40.1 |
| 6,332,765 B1 | 12/2001 | Spelleken | 425/67 |

FOREIGN PATENT DOCUMENTS

| | | |
|---|---|---|
| EP | 0418941 | 3/1991 |
| GB | 1388297 | 3/1975 |
| GB | 2154501 | 9/1985 |
| GB | 2319206 | 5/1998 |

OTHER PUBLICATIONS

Gala brochure, Pneumatically Adjustable Cutter.
Gala brochure, Underwater Pelletizing Systems.
Gala brochure, Quality.

* cited by examiner

UNDERWATER PELLETIZER WITH POSITIVELY CONTROLLED CUTTER HUB

CROSS-REFERENCE TO RELATED APPLICATION

This is a complete utility application entitled to the priority and claiming the benefit of U.S. provisional application Ser. No. 60/378,660, filed May 9, 2002.

BACKGROUND OF THE INVENTION

1. Field of the Invention

The present invention relates to an underwater pelletizer and more specifically to a cutter hub and blade assembly supported and driven for rotational movement and axial movement in relation to the die face of a die plate in an underwater pelletizer. The supporting and driving arrangement for the cutter hub and blades includes a positive control of axial movement of the cutter hub and blades in relation to the die face as the cutter hub and blades are moved toward and away from the die face to obtain and maintain axial adjusted positions of the cutter hub and blades to minimize wear on the mechanical components involved. Positive control of the axial movement of the cutter hub and blades is obtained by a hydraulic/pneumatic actuation system controlling a motion rod extending through a driven hollow motor shaft with one end of the motion rod connected with a hydraulic/pneumatic control and the other end being rigidly connected to a cutter hub holder that supports the cutter hub and blades to move the cutter hub and blades toward and away from the die face.

2. Description of the Prior Art

Underwater pelletizers including a cutter hub holder supporting a cutter hub and blades associated with a die face in order to rotate the blades to cut strands of extruded polymer into pellets within a water box through which water is circulated to cool and harden the pellets and convey a slurry of pellets to an outlet in the water box are well known. Prior U.S. Pat. No. 6,332,765 issued Dec. 25, 2001 for Cutter Hub Holder discloses a cutter hub holder, cutter hub and blades biased toward the die plate by variable pressure through a resilient structure incorporated into supporting and driving engagement with the cutter hub and blades. The present invention comprises an improvement over the cutter hub holder disclosed in aforesaid U.S. Pat. No. 6,332,765 which, together with the prior art of record therein are incorporated herein by reference as if fully set forth herein.

In U.S. Pat. No. 6,332,765, the cutter hub holder is connected to and supports the cutter hub and blades and is drivingly connected to a motor shaft. The motor shaft extends through an electric motor and is hollow throughout its length. One end of the motor shaft is communicated with a stationary rotary transmission lead that is communicated with a source of fluid pressure through a pressure regulating valve. The hollow motor shaft includes a piston and piston rod moveable in the interior of the hollow motor shaft which defines a cylinder for the piston to move the piston and piston rod axially in relation to the motor shaft. The piston rod is connected to a cutter hub holder through a resilient device, such as a spring, to bias the cutter hub holder, cutter hub and blades thereon toward the die face. This structure provides an axial force to move the cutter hub and blades toward the die plate but does not provide any force to move the cutter hub and blades axially away from the die face. Further the prior art does not provide a mechanism for positively controlling the movement of the cutter hub and blades toward and away from the die plate.

SUMMARY OF THE INVENTION

This invention provides a positive control of the positions of a cutter hub and blades in relation to a face of an underwater pelletizer.

It is an object of the present invention to provide a control mechanism in which axial movement of the cutter hub and blades in relation to the die face is positively controlled in both directions of cutter blade adjustment axially in relation to the die face of a die plate in an underwater pelletizer.

Another object of the present invention is to provide a positive control of the relationship between the cutter hub and blades and the die face in an underwater pelletizer in which positive control of movement in both directions is provided by a hydraulic/pneumatic actuation system mechanically connected to the cutter hub through an elongated motion rod fixedly connected to the cutter hub holder that supports the cutter hub.

A further object of the present invention is to provide a positive control for the cutter hub and blades in accordance with the preceding object in which the motion rod connected to the cutter hub holder extends through a hollow motor shaft and rotatably connects to the piston rod of a double acting hydraulic actuated piston and cylinder assembly on the opposite side of the motor from the cutter hub and blades. The piston and cylinder assembly are associated with an air-oil pressure system that controls a closed hydraulic circuit that functions to move the motion rod, cutter hub, cutter hub holder and cutter blades in a positively controlled manner due to the incompressibility of the hydraulic fluid associated with the piston and cylinder and the economical use of air pressure directly on the closed hydraulic circuit. Lock positions of the motion rod, cutter hub holder, cutter hub and blades is obtained by a blocking valve positioned within the fluid circuits.

A still further object of the present invention is to provide a positively controlled cutter hub for effectively controlling movement of the cutter hub and blades in both directions in relation to the die face of a die plate in an underwater pelletizer in which the structure enables assembly and disassembly of the cutter hub and cutter hub holder, the drive structure for the cutter hub holder and the elongated motion rod connected to the cutter hub holder at one end and rotatably connected to the piston in the hydraulic cylinder in closed hydraulic circuit at its other end, with the hollow shaft guidingly supporting said motion rod during its axial movement.

Still another object of the present invention is to provide a positive control axial movement of the blades of an underwater pelletizer in accordance with the preceding objects in which the motion rod connected to the pelletizer blade hub holder is moved axially forward toward the die face as well as axially backwards away from the die face and rotates with the hollow motor shaft of the pelletizer motor in order to isolate any torsional forces created by operation of the motor during pellet cutting. This assembly eliminates the need for a cylindrical or barrel piston, piston rod and spring assembly in the motor shaft, thus reducing the number of mechanical components and providing direct mechanical connection between the motion rod and the cutter hub holder, cutter hub and cutter blades.

Yet another object of the present invention is to provide a positive control for the cutter hub and blades of an underwater pelletizer in which the closed circuit hydraulic double acting cylinder and piston connected to the motion rod has both ends of the cylinder connected to an air-oil actuator through independent stop valves which serve to hold the pelletizing blades in their position once operating pressure has been reached so as to insure a uniform pellet shape. Each air-oil actuator is communicated with a source of air pressure through a proportional valve. The air pressure is translated to a hydraulic fluid pressure in the air-oil actuator for positively controlling movement and position of the piston in the hydraulic cylinder. The piston rod extending from the piston is directly connected to the rotatably driven motion rod which in turn is directly connected to the cutter hub holder, cutter hub and cutter blades all of which are moved axially in both axial directions in unison with the piston in the double acting hydraulic cylinder.

Yet a further object of the present invention is to provide a positive control for a cutter hub and cutter blades in an underwater pelletizer for movement in both axial directions in relation to a die face by utilizing the elongated motion rod extending through the hollow motor shaft and rotatably connected to a piston of a double acting hydraulic cylinder at an end of the rod opposite to the cutter hub and blades with the end of the motion rod adjacent the cutter hub being threadedly engaged with the cutter hub holder which is threadedly engaged with the cutter hub to enable easy assembly and disassembly of the components. A lock screw is preferably threaded into the cutter hub holder and engaged with the threaded end of the motion rod to lock the cutter hub holder in nonrotative relation to the motion rod to assure continuous engagement between the motion rod and cutter hub holder but yet enabling easy disassembly by removing the lock screw and threadedly uncoupling the cutter hub holder from the motion rod.

An additional object of this invention to be specifically enumerated herein is to provide an underwater pelletizer with positively controlled cutter hub in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construct 8 on and operation as more fully hereinafter described and claimed, reference being had to the accompanying drawings forming a part hereof, wherein like numeral refer to like parts throughout.

DESCRIPTION OF THE PREFERRED EMBODIMENT

Figure 1:
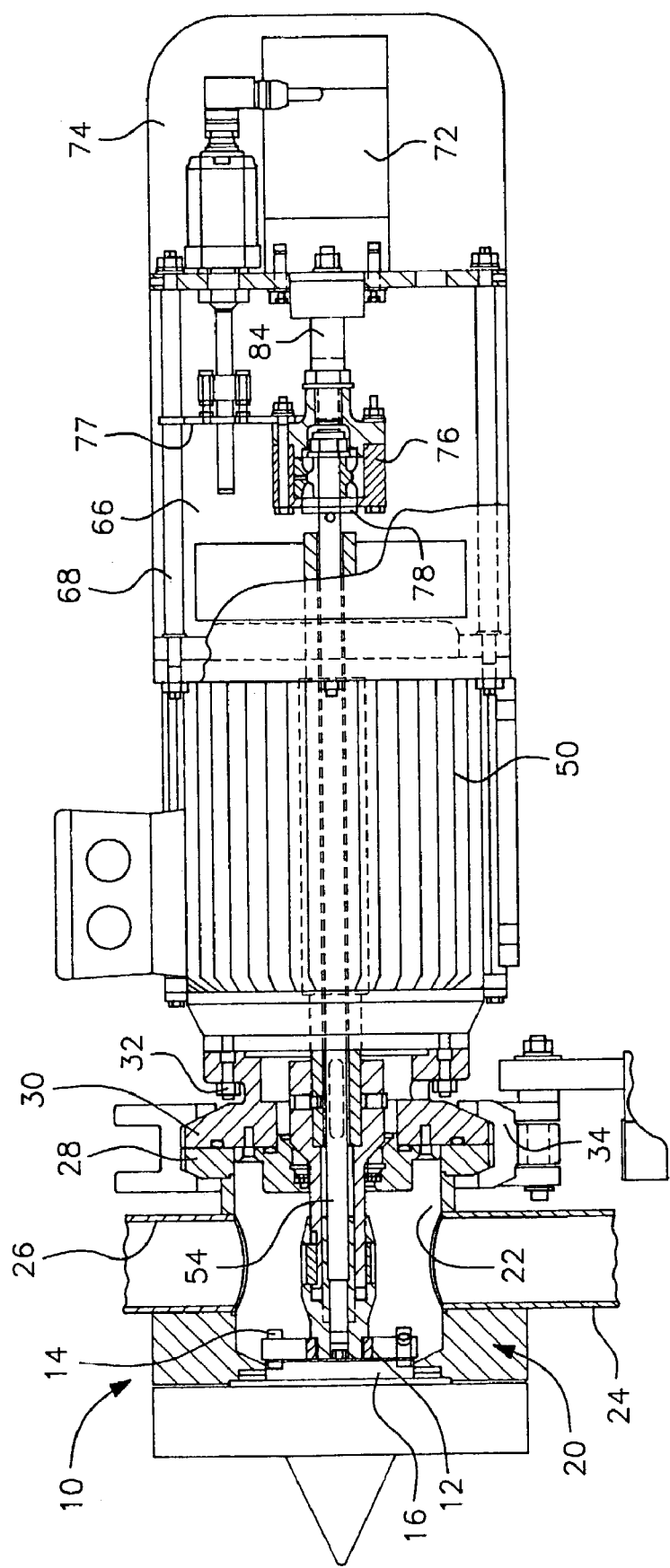
FIG. 1 is a side elevational view of an underwater pelletizer, partly in section, illustrating the structural details and relationships of the components of the positive control of the cutter hub and cutter blades in accordance with the present invention.

Although only one preferred embodiment of the invention is explained in detail, it is to be understood that the embodiment is given by way of illustration only. It is not intended that the invention be limited in its scope to the details of constructions and arrangement of components set forth in the following description or illustrated in the drawings. Also, in describing the preferred embodiment, specific terminology will be resorted to for the sake of clarity. It is to be understood that each specific term includes all technical equivalents which operate in a similar manner to accomplish a similar purpose.

An underwater pelletizer constructed in accordance with the present invention is generally designated by reference numeral 10 in FIG. 1. The pelletizer 10 includes a rotatable cutter hub 12 supporting a plurality of cutter blades 14 associated with the die face of a die plate 16 through which molten polymer or other extrudable material is extruded through extrusion orifices in the die plate, and the cutter blades 14 cut the strands exiting the die face into pellets. A water box generally designated by reference numeral 20 includes an interior 22 having a water inlet 24 and a water and pellet slurry outlet 26 in opposed relation thereto. Water passing through the water box interior 22 cools and solidifies the molten plastic or extrudate as the strands are cut into pellets and entrains the pellets into the water flow for discharge through the outlet 26. The above described structure is a conventional underwater pelletizer such as that disclosed in U.S. Pat. No. 6,332,765. The water box 20 includes a tapered flange 28 abutingly engaging a flange 30 mounted on the end of a motor 50 by fastening bolts 32. The flanges 28 and 30 have oppositely slanted peripheral edge portions for engagement by a two part channel shaped clamp 34 to enable assembly and disassembly of the water box in relation to the motor mounted flange 30 in a conventional manner.

Figure 2:
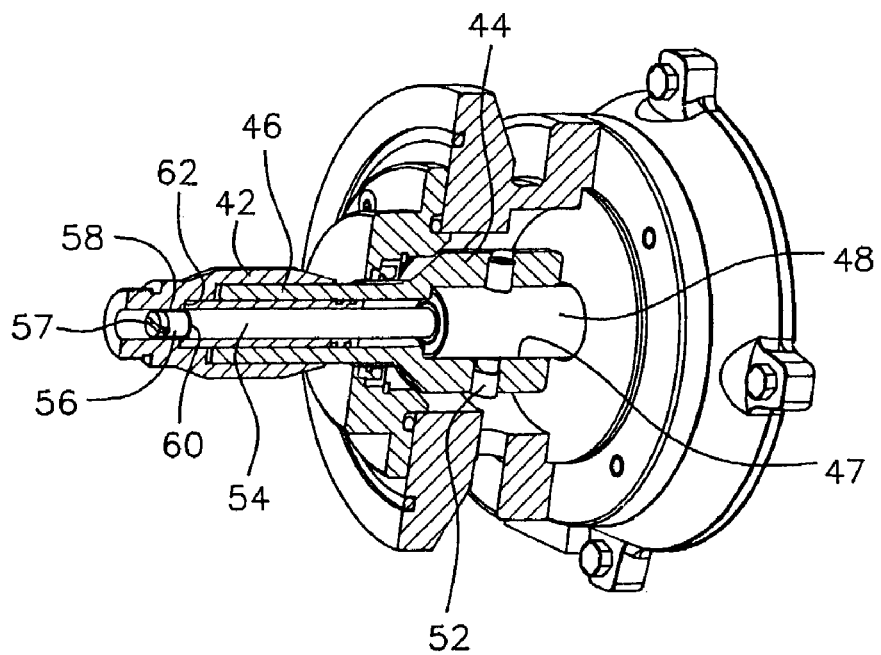
FIG. 2 is a perspective view, partly in section, illustrating the cutter hub holder drivingly connected to the motor shaft and the motion rod extending through the cutter hub holder with the end of the motion rod threadedly engaged with the interior of the end of the cutter hub holder that is threaded into the cutter hub, in accordance with the present invention.
Figure 3:
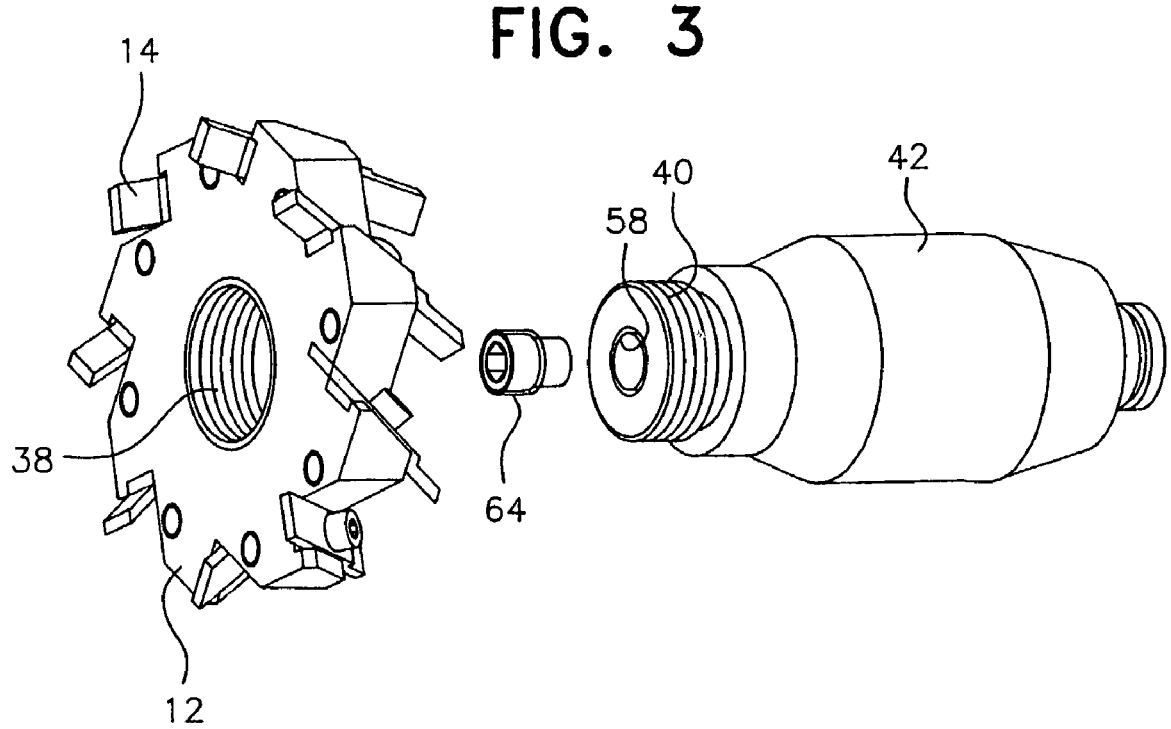
FIG. 3 is a partially exploded perspective view illustrating the relationship of the cutter hub holder, cutter hub with blades and a lock screw that threadedly engages the internal threads in the cutter hub holder and locks the motion rod against rotation in relation to the cutter hub by contact with the end of the motion rod, in accordance with the present invention.

As illustrated in FIG. 3, the cutter hub 12 includes a centrally disposed internally threaded opening 38 which screw threadably receives a male threaded, reduced diameter end portion 40 of a cutter hub holder 42. As illustrated in FIG. 2, the cutter hub holder 42 is slidingly and drivingly connected to an intermediary 44 by a slidable spline drive connection 46 in the form of longitudinal grooves and ridges in a manner similar to that disclosed in U.S. Pat. No. 6,332,765. The intermediary 44 includes a longitudinal recess 47 of larger diameter than the portion of intermediary which engages with the cutter hub holder 42 for receiving a motor shaft 48 which extends through the center of the electric drive motor 50. The intermediary 44 is drivingly connected to the motor shaft 48 by set screws 52 or similar fastening devices. The structure of the motor shaft 48, intermediary 44 and cutter hub holder 42 are the same as disclosed in the aforesaid U.S. Pat. No. 6,332,765.

Figure 4:
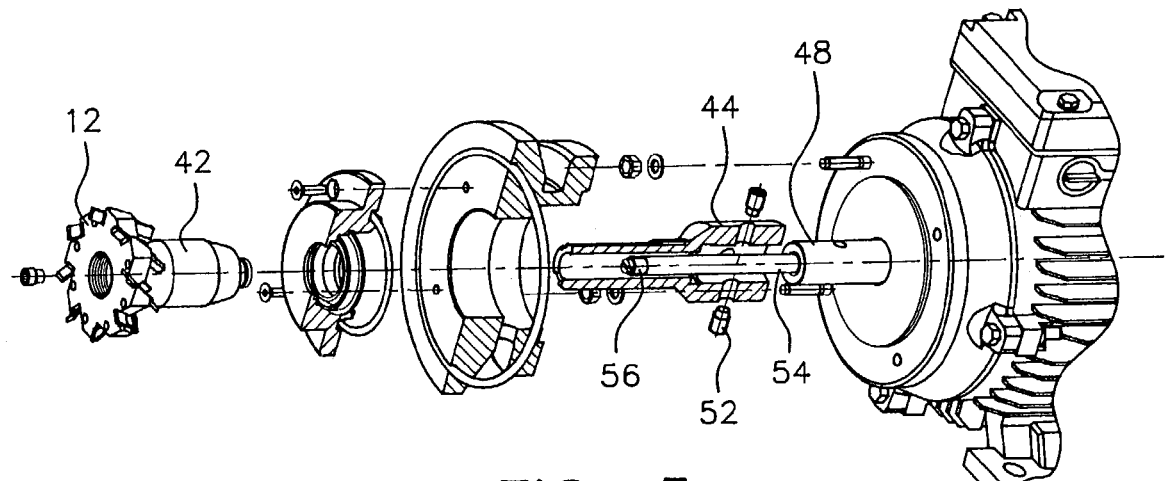
FIG. 4 is an exploded group perspective view, with portions in section, illustrating further association of the motor shaft, pelletizer shaft, the driving connection between the shafts, the motion rod and the relationship to the cutter hub holder and cutter hub with the lock screw positioned for threaded engagement with the end of the cutter hub holder in accordance with the present invention.
Figure 5:
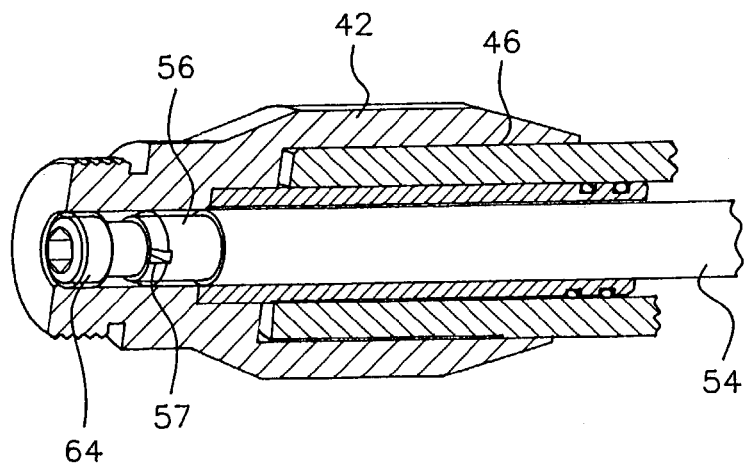
FIG. 5 is a perspective view partially in section illustrating the spline structure of the cutter hub holder and the relationship between the lock screw, the cutter hub holder and the end of the motion rod in accordance with the present invention.

As illustrated in FIGS. 2–4, the motor shaft 48 is hollow and includes an elongated one piece motion rod 54 extending completely through the motor shaft 48 and the motor 50. The motion rod 54 includes a reduced diameter threaded end 56 which is screw threadedly engaged with an internally threaded end portion 58 of the cutter hub holder 42. The reduced end 56 of motion shaft 54 has a screw driver receiving kerf 57 therein to enable assembly and disassembly of motion rod 54 and cutter hub holder 42. The reduced threaded end 56 on rod 54 defines a shoulder 60 which abuts an inner shoulder 62 at the inner end of the internally threaded portion 58 of the end of the cutter hub holder to thereby screw threadedly connect the threaded end 56 of the motion rod 54 to the interior of the cutter hub holder 42. A lock screw 64 is threaded into the internally threaded end portion 58 of the cutter hub holder 42 into abutting engagement with the end of the motion rod 54 to provide a locking action between the external threads on the motion rod 54 and the internal threads 58 in the end of the cutter hub holder 42. The holder 42 is threaded into the cutter hub 12 by external threads 40 engaging the internal threads 38 in the cutter hub 12.

The spline coupling 46 enables the cutter hub holder 42 to elongate or shorten as determined by movement of the motion rod 54. The lock screw 64 enable assembly and disassembly of the cutter hub holder 42 from the motion rod 54 and locks the cutter hub holder and cutter hub fixedly but detachably to the motion rod 54.

Figure 7:
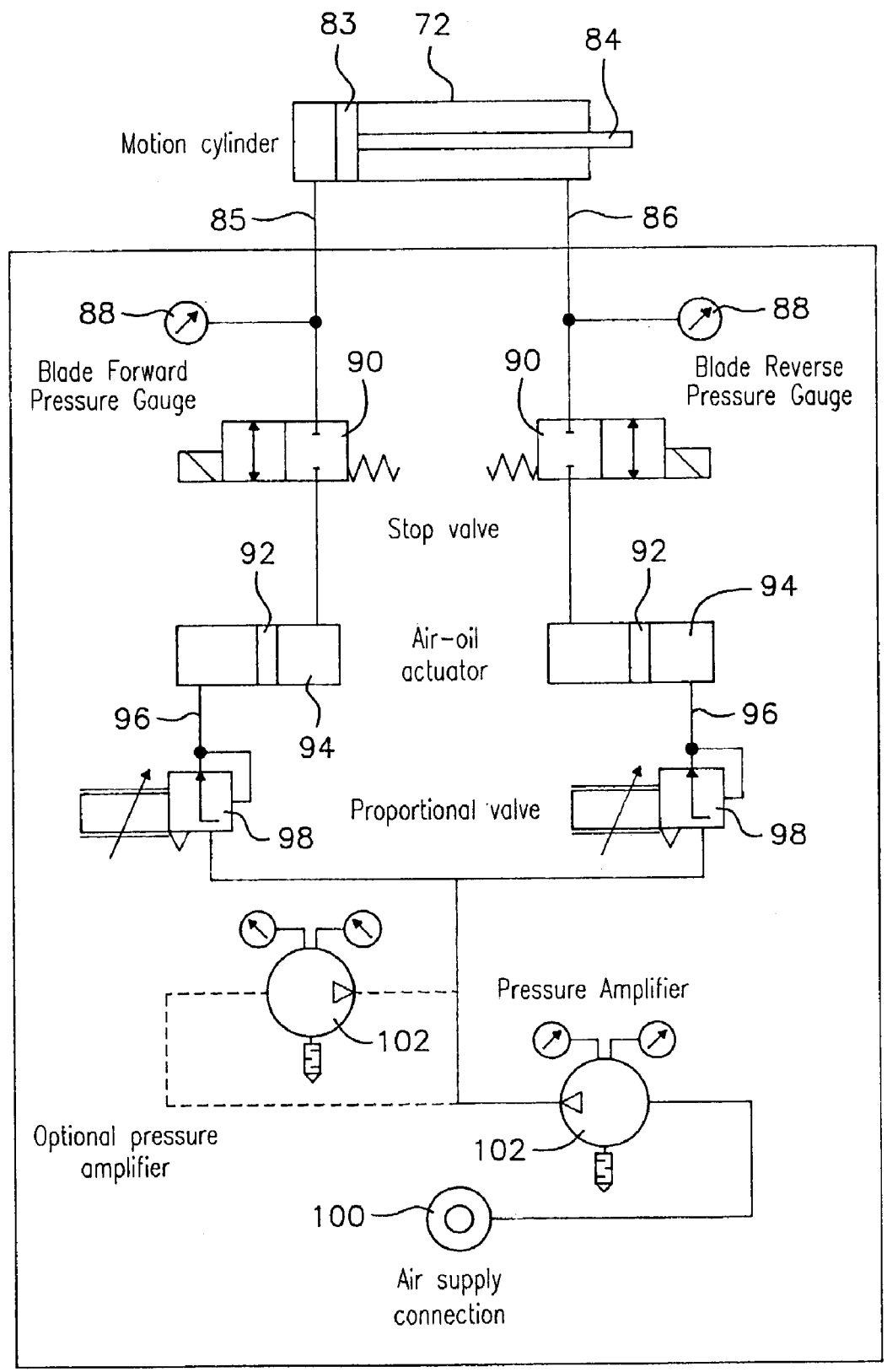
FIG. 7 is a schematic diagram of the closed hydraulic fluid circuit and the pneumatic circuit for controlling flow in the hydraulic circuit in accordance with the present invention.

Turning back to FIG. 1, the motor 50 includes a housing extension 66 which is supported from the motor 50 by elongated bolts 68. Housing extension 66 is closed at its remote end by an end plate that supports a double acting hydraulic cylinder 72 outwardly thereof, preferably within a rear enclosure 74. The motion rod 54 which extends through the motor drive shaft 48 is provided with a rotary coupling 76 in the interior of the housing extension 66. A bracket 77 supports the coupling 76 and a thrust bearing 78. The hydraulic cylinder 72 includes a piston 83 and piston rod 84 connected with the coupling 76 to rotatably connect the motion rod 54 to non-rotatable piston rod 84. FIG. 7 illustrates the function of the double acting hydraulic cylinder 72 to transmit forward or backward motion forces to the piston 83, and through piston rod 84 and thrust bearing 78, to motion rod 54 and thus to the pelletizer cutter hub and blades.

Figure 6:
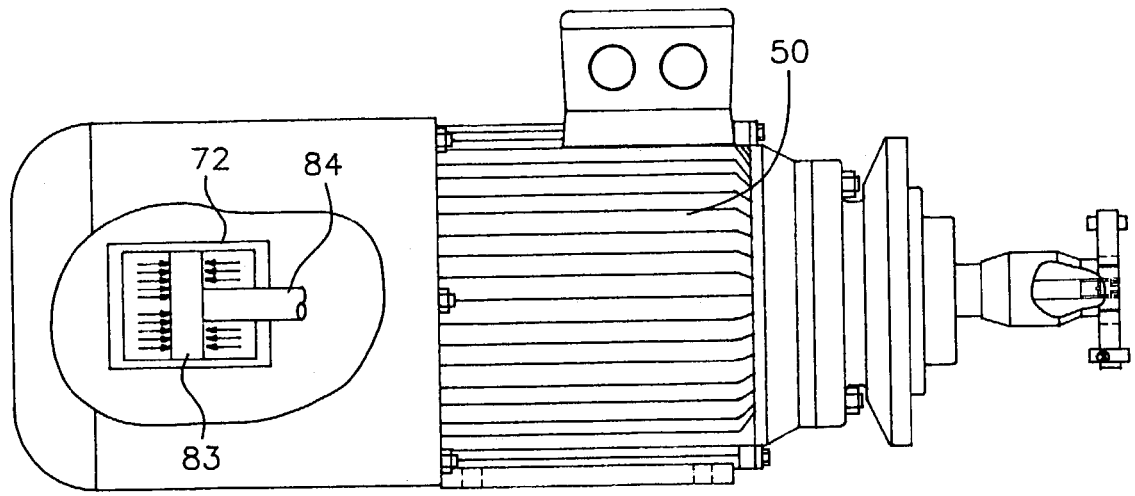
FIG. 6 is a schematic elevational view of the double acting hydraulic cylinder and piston illustrating fluid pressure on the piston in both axial directions in accordance with the present invention.

More specifically, the double acting motion cylinder 72 generates the pressure for advancing or withdrawing the blades as triggered by the control system illustrated in FIG. 7. The control system provides hydraulic fluid pressure that is incompressible to the cylinder 72 on opposite sides of the piston 83 as shown in FIG. 6 to move the piston rod 84 and thus the motion rod 54 in opposite directions, moving the cutter hub and blades either towards or away from the die face. Hydraulic fluid is supplied to opposite ends of the cylinder 72 by hydraulic fluid pressure lines 85 and 86 each of which includes a pressure gauge 88. The hydraulic line 84 provides for forward motion of the piston 83 and motion rod 54, and the hydraulic line 86 provides backward motion of the piston 83 and motion rod 54. Each of the hydraulic lines 85 and 86 is also provided with a stop valve 90 which is connected to one end of an air-oil actuator 92 which includes a cylinder 94 having the fluid pressure lines 85 and 86 connected to one end of the cylinder 94 and an air supply line 96 connected to an outer end of a cylinder 94. Each air supply line 96 is provided with a proportional valve 98 communicated with an air supply 100 through a pressure amplifier or amplifiers 102 depending upon the air pressure supply.

The air-oil system includes two pressure circuits that can be controlled independently from one another including a blade forward pressure circuit and a blade back pressure circuit. In the blade forward pressure circuit the pelletizing pressure is controlled by a proportional valve to automatically insure the optimum pelletizing pressure in each operating phase. The generated pneumatic blade forward pressure is translated into a fluid pressure in an air-oil actuator and this incompressible fluid pressure then acts on the piston side of the double acting cylinder to move the blade forward or toward the die plate.

The blade back pressure circuit provides a backward motion or pressure which is also set by a proportional valve and translated into a fluid pressure in an air-oil actuator to act on the side of the piston to move the blades backwards or away from the die plate. Thus, the two variables providing fluid pressure on opposite sides of the piston insures an optimum positioning of the pelletizer blades and avoiding any unnecessary blade wear. The stop valves in the control circuits serve to hold the pelletizing blades in their position after start up of the pelletizer and proper operating pressure has been reached so as to insure a uniform pellet shape.

The positive controlled movement of the cutter hub and blades enables control of the forces acting on the blades and the die plate in all operating stages to reduce wear of the pelletizing blades and die face. The double acting motion cylinder 72 generates pressure for advancing or withdrawing the blades with the pressure being transmitted to the cutter hub holder and thus to the cutter hub blades by the motion rod 54 which is fixed to the cutter hub holder and passes through and rotates with the hollow motor shaft.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. In an underwater pelletizer, the combination comprising a rotatable cutter hub supporting cutter blades acting in conjunction with a die plate of an underwater pelletizer to cut extruding strands into pellets and a driven shaft rotatably supporting said cutter hub for positive axial movement of the cutter hub toward and away from the die plate, said driven shaft being hollow and extending through a drive motor, a motion rod slidable through said hollow shaft and connected to said cutter hub, a double acting hydraulic cylinder supported from the motor in remote relation to the cutter hub and including a piston connected to the motion rod to move the motion rod in forward and rearward axial directions thereby moving the cutter hub in a forward and rearward direction in response to hydraulic fluid pressure introduced to opposite sides of said piston in said hydraulic cylinder.

2. The underwater pelletizer as defined in claim 1, wherein said hydraulic fluid pressure introduced into the cylinder on opposite sides of the piston therein being provided by a pair of air-oil actuators each being supplied air pressure through proportional valves communicated with an air pressure source, each of said air-oil actuators discharging pressurized hydraulic fluid to one side of said piston in said hydraulic cylinder thereby utilizing air pressure to supply controlled hydraulic pressure to opposite sides of said piston in said double acting hydraulic cylinder.

3. The underwater pelletizer as defined in claim 2, wherein said motion rod is screw threadedly connected to a driven cutter hub holder, said cutter hub holder being in screw threaded engagement with said cutter hub and a lock screw threaded into the cutter hub holder to lock the cutter hub holder in screw threaded engagement with said motion rod.

4. In an underwater pelletizer including a die plate through which polymer strands are extruded through a die face into a water box, a cutter hub and cutter blades in said water box to cut said extruded strands into pellets, said water box including a water flow therethrough to solidify the strands for cutting into pellets and entraining pellets cut from the strands in the water flow as a slurry for discharge from said water box, a cutter hub holder connected to said cutter hub, a motor having a drive shaft drivingly connected to said cutter hub holder through a drive connection to enable the cutter hub and blades thereon to move axially toward and away from said die face on the die plate, the improvement comprising said drive shaft being hollow, an axially moveable and rotatable motion rod extending through said drive shaft and being connected to an axially movable portion of said cutter hub holder to move said cutter hub and blades axially in relation to said die face and a positive control engaged with said motion rod remotely from said cutter hub holder to move said axially movable portion of the cutter hub holder, cutter hub and blades positively toward and away from said die face.

5. The underwater pelletizer as defined in claim 4, wherein said positive control engaged with said motion rod comprises a double-acting hydraulically activated piston and cylinder assembly, said piston including a reciprocal non-rotative piston rod axially aligned with said motion rod and connected thereto by a rotatable coupling to transmit axial movement of said motion rod toward and away from said die face.

6. The underwater pelletizer as defined in claim 5, further comprising a closed non-compressible fluid circuit communicated with opposite ends of said hydraulic cylinder and a pneumatic control system including a pair of air/oil actuators in said closed non-compressible fluid circuit.

7. In an underwater pelletizer including a die plate through which polymer strands are extruded through a die face into a water box, a cutter hub and cutter blades in said water box to cut said extruded strands into pellets, said water box including a water flow therethrough to solidify the strands for cutting into pellets and entraining said pellets in the water flow as a slurry for discharge from said water box, a motor having a drive shaft driving said cutter hub to enable the cutter hub and blades thereon to move axially toward and away from said die face on the die plate, the improvement comprising said drive shaft being hollow, an axially moveable and rotatable motion rod extending through said drive shaft and being connected to said cutter hub to move said cutter hub and blades axially in relation to said die face, and a positive control engaged with said motion rod remotely from said cutter hub to move said cutter hub and blades positively toward and away from said die face, said positive control engaged with said motion rod including a double-acting hydraulic piston and cylinder assembly, said piston of said assembly including a reciprocal non-rotative piston rod axially aligned with said motion rod and connected thereto by a rotatable coupling to positively transmit axial movement of said motion rod toward and away from said die face, said cylinder of said assembly including a closed non-compressible hydraulic fluid circuit communicated with opposite ends of paid piston and a pneumatic control system including a pair of air-oil actuators in said closed non-compressible hydraulic fluid circuit.

8. In the underwater pelletizer improvement as claimed in claim 7 wherein each of said air-oil actuators includes a piston and cylinder, each of said air-oil cylinders having one end thereof communicated with one end of said cylinder of said piston and cylinder assembly engaged with said motion rod through a stop valve, the other end of each of said air-oil actuator cylinders communicating with a pressured air source through a proportional valve to positively control axial movement of said motion rod, cutter hub and blades thereon in relation to said die face.

* * * * *